Patented July 25, 1939

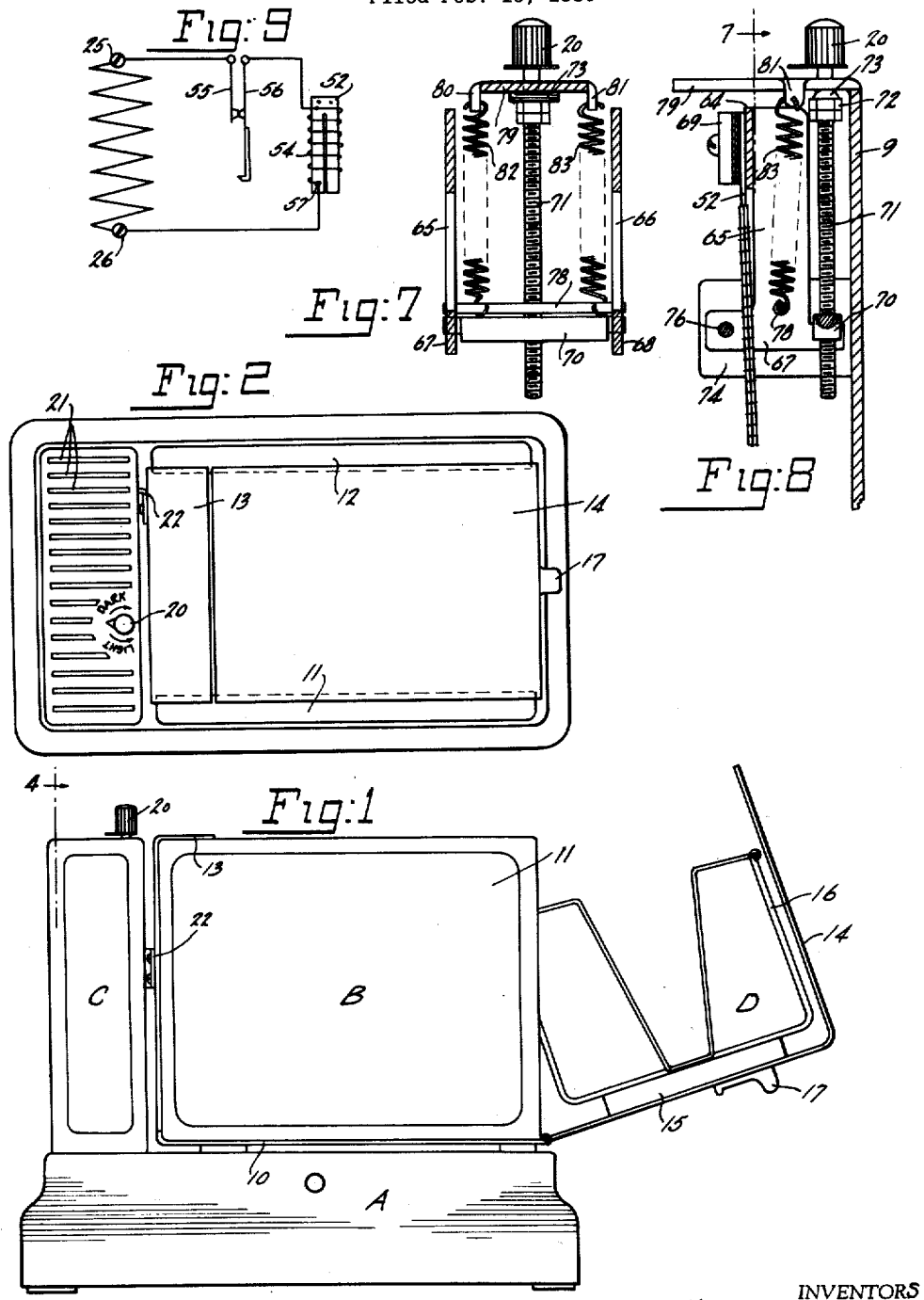

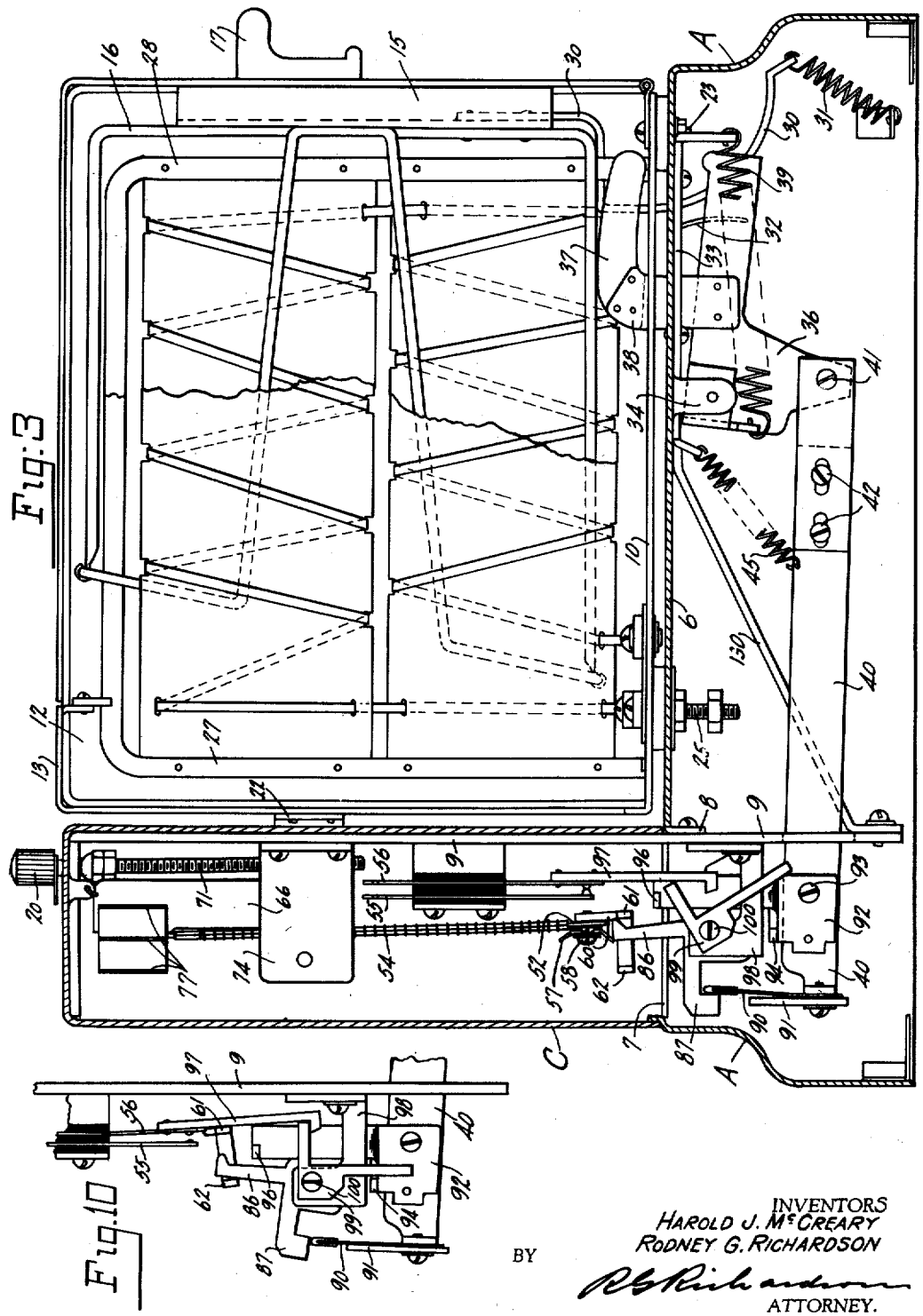

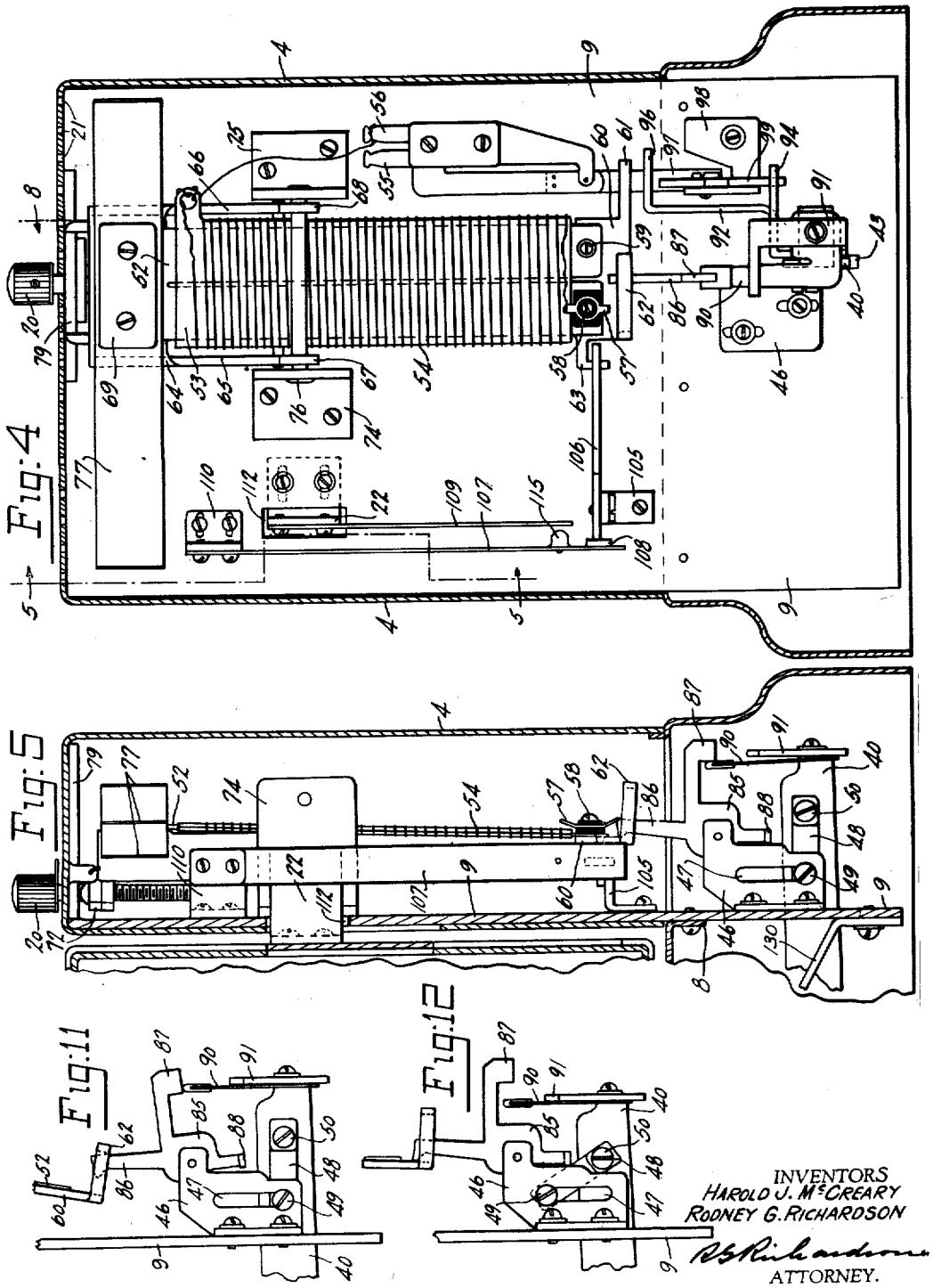

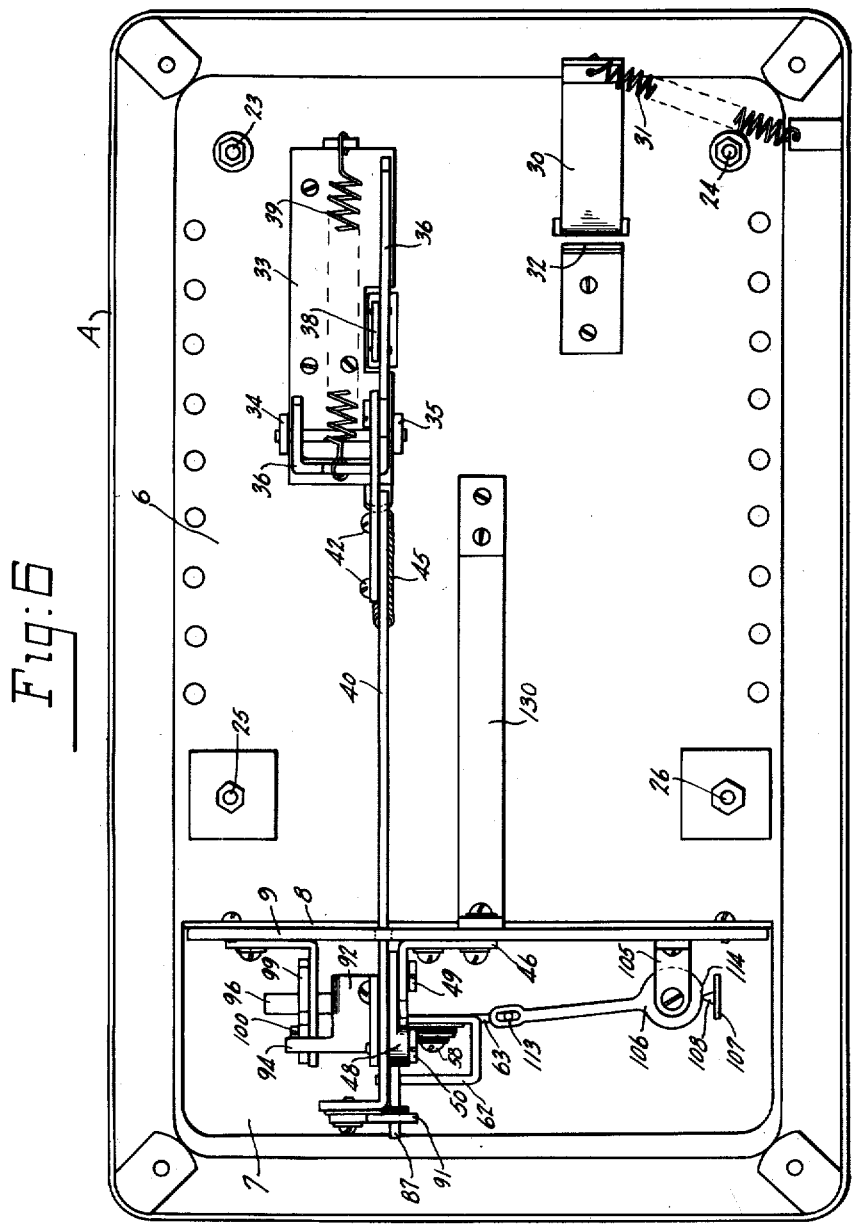

2,167,121

UNITED STATES PATENT OFFICE 2,167,121

TIMING AND TIMING DEVICE

Harold J. McCreary, Lombard, and Rodney G. Richardson, Chicago, Ill.

Application February 19, 1936, Serial No. 64,630

31 Claims. (Cl. 219—19)

The present invention relates in general to timing and timing devices, and the object of the invention is a new method of timing and a new and improved timing device.

In carrying out the invention a heat responsive element is used, which may be a bi-metallic strip, and the same is heated and allowed to cool. A time interval is measured by the combined heating and cooling periods, or at least the cooling period is included.

The invention includes a number of different features, which will be described hereinafter with reference to the accompanying drawings, in which the invention is shown as used for timing an automatic bread toaster.

Referring to the drawings, Fig. 1 is a side view of the complete toaster with the slice carrier open;

Fig. 2 is a top view of the complete toaster, with the slice carrier closed;

Fig. 3 is a view of the toaster from the same position as in Fig. 1, with the slice carrier closed and one side of the casing removed to expose the timing mechanism and other parts;

Fig. 4 is an end view, from the left in Fig. 1, with the casing cut away on the line 4;

Fig. 5 is a partial side view from the opposite side to that shown in Fig. 3, with the casing and timer mounting plate cut away on the line 5, Fig. 4;

Fig. 6 is a view from the bottom of the toaster;

Figs. 7 and 8 show details of the adjustable mounting means for the heat responsive element;

Fig. 9 is a circuit diagram, showing the electrical connections; while

Figs. 10, 11, and 12 are views of parts of the timing mechanism in different stages of operation.

The toaster shown in Fig. 1 comprises a base A, a toasting compartment B, a timer compartment having a cover or casing C, and a hinged slice carrier D. The latter is shown open in Fig. 1, ready to receive slices of bread to be toasted.

The base A may be made of sheet steel, pressed to the shape shown in Fig. 1, also Figs. 2 to 6, inclusive. The upper flat surface or roof 6 of the base is cut away to leave an opening 7, see Fig. 6, and a portion of the material 8 is bent down at right angles, as seen particularly in Figs. 3 and 5. The opening 7 is squarely beneath the casing C of the timing compartment.

In the timing compartment C and extending down through the opening 7 into the base is a heavy plate 9, which is secured by means of screws to the down turned portion 8 of the base. The plate 9 is further secured by means of a brace 10. It will be seen that the lower part of plate 9 forms a partition across the base A, and that the timing compartment extends down through opening 7 and includes that portion of the space within the base which lies to the left of the plate 9 in Fig. 3. The timing mechanism is mounted on plate 9.

The casing for the timing compartment C is of box like conformation, open at the bottom, and rests on the roof 6 of base A. The casing can be removed by first taking off the adjusting knob 20, the side next the compartment B being slotted in line with the bracket 22. At the top of the casing there is a series of openings 21, forming a grill. The base A is set on rubber discs at the corners as shown in Fig. 1, and air can enter under the sides of the base. In the operation of the toaster a circulation of air is established up through the timing compartment and out through the grill 21, as will be described more fully later on.

The toasting compartment B may be of conventional design. As shown herein it comprises a bottom plate 10, two sides 11 and 12, and end 13, the latter lapping over the sides as shown in Fig. 2 and extending part way over the top. The slice carrier D includes an L shaped member 14 which is hinged to the bottom plate 10 as shown and which is adapted to close the top and right hand end of the toasting compartment, as shown clearly in Fig. 2. A handle 17 is provided to open and close the slice carrier. On the inner side of member 14 there is a sheet metal bracket 15 to which are attached two slice holders 16. Only one of these can be seen in the side view, Fig. 1, but it will be understood that they are spaced apart on opposite sides of handle 17.

The toasting compartment becomes hot in the operation thereof and is preferably spaced away from the base and timing compartment as shown. It is secured to the base by means of screws 23 and 24 at the right hand end and by screws 25 and 26 at the left, discs of some non-conducting substance such as Bakelite being interposed to provide the desired spacing. The screws 25 and 26 serve as binding posts for the attachment of the service cord and afford a path for electrical communication from the base to the heating elements in the toasting compartment.

The interior of the toasting compartment is exposed in Fig. 3. There are three heating elements of conventional construction spaced apart and mounted one on each side and one in the center, so that the two slice holders 16 each have a heating element on both sides when the slice carrier is closed, the center heating element being common to both slice holders. Fig. 3 shows the left hand half of the heating element 27, the one nearest the observer, and the right hand half of the center heating element 28, the nearest heating element being broken away so as not to obscure the throw out cam 37. The three heating elements are connected in series across the binding posts 25 and 26. Suitable auxiliary terminals are provided in the bottom of the toasting compartment for accomplishing this, as indicated in Fig. 3, but as the arrangement is well known it is not shown in detail.

The slice carrier stays in closed position by gravity, that is, by its own weight, and is arranged to be automatically thrown to open position under control of the timing mechanism, as will be described. To facilitate the movement to open position and to stop it without shock, there is provided a curved arm 30 and spring 31. The arm 30 is attached to the bracket 15, in line with the slice holder which is behind the one seen in Fig. 3, and passes down thru slots in bottom 10 and roof 6. The spring 31 is attached to the base A at the proper point so that it will help to move the slice carrier to open position at the beginning of the movement and will oppose the movement toward the end thereof. There is also provided a buffer spring 32 which is engaged by the end of arm 30 as the slice carrier reaches its open position.

The mechanism for throwing out the slice carrier will now be described. Inside the base A and secured to the roof 6 by screws there is a bracket 33, having downwardly extending ears 34 and 35. Between these ears there is pivoted a lever 36, the shape of which can be seen in Figs. 3 and 6. To the lever 36 there is attached a throw out cam 37 which may be attached to the lever by a strip of material 38 which is non-conductive of heat. The roof 6 and bottom 10 are slotted to permit the strip 38 to pass through. The lower surface of the slice holder 16 rests on the throw out cam 37 when the slice carrier is in closed position.

The lever 36 is urged to turn on its pivot by a coil spring 39, which extends between the lever and bracket 33, but is prevented from doing so by the locking arm 40. This arm is pivoted on the lever 36 by means of a shoulder screw 41 and is in two parts so that its length can be exactly adjusted. The two parts are held together by screws 42. The locking arm 40 extends to the left in Fig. 2 and passes through a slot 43, Fig. 4, in the plate 9 and into the timing compartment. It is held against the upper edge of the slot 43 by means of a spring 45.

Referring now particularly to Fig. 5, it will be seen that there is a bracket 46 mounted on plate 9 in the timing compartment, and on the locking arm 40 there is pivoted a locking link 48 by means of a shoulder screw 50. The link 48 lies between the arm 40 and bracket 46, see Fig. 6, and at the end opposite the pivot 50 there is a shoulder screw 49 which lies in the slot 47 in bracket 46. This screw 49 is threaded in the link 48 and its shoulder is adapted to slide readily in slot 47. The locking arm 40 is urged to the right in Figs. 3 and 6, and to the left in Fig. 5, by spring 39, but as readily seen from the latter figure it is locked by the locking link 48 due to engagement of the shoulder screw 49 with the edge of slot 47. The bracket 46 is preferably adjusted so that when the shoulder screw 49 lies in the bottom of slot 47, as seen in Fig. 5, the link 48 will be on dead center, and to readily secure this adjustment the bracket has slots for the attaching screws as shown in Fig. 4.

It will be understood now that if the end of locking arm 40 is pressed down against the tension of spring 45 the link 48 will no longer be on dead center and the locking arm will be released. The locking arm moves suddenly to the left, Fig. 5, to the position shown in Fig. 12, the link 48 turning on its pivot 50 and the shoulder screw 49 traveling along the slot 47. In Fig. 3 the locking arm 40 moves to the right. The movement of the locking arm is of course due to rotation of lever 36 by the tensioned spring 39. The rotation of lever 36 moves the throw out cam 37 upward and an impulse is given to the slice carrier sufficient to throw it to open position.

If the slice carrier is now closed by hand the lower side of slice holder 16 will engage the cam 37 and will rotate the lever 36 to the position in which it appears in Fig. 3. As the lever 36 rotates on its pivot the locking arm 40 moves to the left. As this movement takes place the shoulder screw 49, Fig. 12, travels down in the slot 47 and the link 48 assumes the position in which it is shown in Fig. 5. The length of the locking arm 40 should be adjusted so that when the slice carrier is fully closed the link 48 will drop freely to dead center position, but there should be very little play between the shoulder screw 49 and the edge of the slot.

Turning now to a consideration of the timing mechanism, the main heat responsive element is a bi-metal strip 52. As shown herein, see Figs. 4, 3, and 5, this bi-metal strip is about an inch wide and 4½ inches long. It is bisected throughout its length, except for a portion at the upper end where it is secured to its support, in order to permit it to bend more readily when heated. On each side of the strip 52 there is a strip of mica 53 of somewhat greater width. These mica strips serve to insulate the heating winding 54. The latter consists of spaced turns of suitable resistance wire and is wound tightly to securely hold the mica strips in place. The wire indents the edges of the strips and the separate turns are thus kept separated. One end of the winding is terminated at spring 55 and the other end at the terminal 57.

The lower end of bi-metal strip 52 is secured to a member 60 by means of screws 58 and 59. Screw 58 also serves to attach terminal 57, which is suitably insulated. The member 60 is provided with arms 61, 62, and 63, and may be formed of one piece of metal, with 62 bent as shown clearly in Fig. 6. The purpose of arms 61, 62, and 63 will be fully explained later on.

The bi-metal strip 52 is mounted on an adjustable support the shape of which can be seen clearly enough in Figs. 4 and 5, also in the detail views Figs. 7 and 8. This support may be a stamping pressed to the required shape and comprises a cross member 64, two side members 65 and 66 and two end members 67 and 68, all in one piece. The bi-metal strip lies against the cross member 64 and is firmly clamped to it by means of a plate 69 and two screws. Between the plate 69 and the bi-metal strip there are clamped a number of thin strips of copper 77, which function as cooling fins. Three of these strips are shown, see side views Figs. 3 and 5, but more may be provided.

The support for the bi-metal strip is mounted between the two brackets 74 and 75, which are fastened to the plate 9. A pivot rod 76 passes through the ends 67 and 68 of the support and through the brackets. The plate 9 has a bent over part 79, which has a hole, therein providing a loose bearing for the rod 71. The part 79 has two ears 80 and 81, and there is a cross rod 78 extending across the support. Between this rod and the two ears 80 and 81 are tensioned two springs 82 and 83, which tend to rotate the support on the pivot rod 76. Rotation is prevented by the threaded adjusting rod 71 and associated parts. On this rod are lock nuts 72, the upper one of which bears against the half cylindrical bar 73, which in turn bears against the part 79. The lower end of the threaded rod 71 passes through the cross bar 70. This bar 70 has two half round projections, one on each end, which bear against the ends 67 and 68 of the support, these ends being provided with rounded notches to receive the projections. The rod 71 is turned by means of a knob 20. When the knob is turned counterclockwise, or in the direction of the arrow "Light" in Fig. 2, the bar 70 is backed off the threaded rod 71 and rotates the support on pivot rod 76 in the direction which increases the tension in the bi-metal strip, or increases the pressure with which member 60 on the end thereof engages the arm 86 of lever 85, see Fig. 5. When the knob is turned in the opposite direction the bar 70 runs up on the threaded rod 71 and permits the support to rotate on its pivot rod 76 so as to decrease the tension in the bi-metal strip. The rotation of the support in this instance is caused by springs 82 and 83. The arrangement described affords means for securing a very fine adjustment of the position of the bi-metal strip, without any play or lost motion whatever.

The means by which the bi-metal element trips the locking arm 40 includes a lever 85, which is pivoted on the bracket 46. In the normal position of the strip the member 60 presses against the arm 86 which tends to rotate the lever 85. However, rotation is prevented by arm 88 which engages the edge of bracket 46 and thus determines the limit of movement of the member 60, or the end of strip 52, to the right. This refers to the parts as they appear in Fig. 5. At the end of the locking arm 40 there is secured a spring 90, clamped under a member 91. When the bi-metal strip is heated it bends so that the member 60 moves to the left. Before the member 60 reaches the limit of its movement to the left the arm 62 on member 60 engages the arm 86 and rotates lever 85 on its pivot far enough so that the arm 87 clears the end of spring 90 and allows the spring to snap over against member 91. Fig. 11 shows the position of the parts at the instant the member 60 has moved far enough to the left to release the spring 90. As the bi-metal element cools off it returns to the position in which it is shown in Figs. 5 and 12. On the return movement member 60 of course engages arm 86 and rotates the lever 85, whereupon arm 87 presses against the end of spring 90 and moves the end of locking arm 40 downward to release it.

Referring now particularly to Figs. 3 and 10, the arrangement for controlling the heating circuit of the bi-metal strip 52 will be explained. The circuit is shown diagrammatically in Fig. 9. As stated previously the service cord is connected to binding posts 25 and 26, across which are bridged the heating elements in the toasting compartment. The winding 54 is also bridged across these binding posts in series with contact springs 55 and 56. These springs, suitably insulated, are secured to the plate 9 as shown in Fig. 3. To the spring 56 there is secured a member 97, of Bakelite or other insulating material. A bracket 98, secured to plate 9, serves to support a dog 99, pivoted at 100. On the locking arm 40 there is attached a member 92 by means of a screw 93 and the shoulder screw 50. The shape of this member 92 can be understood from Figs. 3, 4, and 6. It is provided with an arm 94 for tripping the dog 99 and an arm 96 for co-operation with the member 97.

When the bi-metal strip is heated, the parts being in the position in which they appear in Fig. 3, its lower end carrying member 60 bends to the right and arm 61 eventually engages the member 97 and separates spring 56 from spring 55, breaking the circuit of the heating coil 54. As the member 97 moves to the right the dog 99 rotates on its pivot until stopped by the hook on the end of 97. The parts thus assume the position in which they are shown in Fig. 10. When the bi-metal strip cools off after its circuit is broken it returns toward normal position and arm 61 leaves member 97, but the latter remains locked by dog 99, holding the circuit open. Near the end of its return movement member 60 trips the locking arm 40 by means of lever 85, as previously explained. The locking arm moving to the right, Figs. 3 and 10, carries member 92 along and arm 94 trips the dog 99. However, the arm 96 has also moved to the right and engaged member 97 to hold the spring 56 away from spring 55. The circuit of winding 54 is not closed, therefore, until the slice carrier is closed again. This operation moves locking arm 40 and member 92 to the left, Fig. 3. The arm 94 now leaves the dog 99 and permits it to rotate toward locking position, Fig. 10, but before it gets very far it is caught by member 97 which has already been released by arm 96. The dog 99 not having reached dead center at this time it is rotated back by spring 56 to which member 97 is attached and spring 56 again engages spring 55 to close the circuit of winding 54.

In addition to the main timing mechanism just described, there is provided an auxiliary timing mechanism for progressively shortening successive timing intervals as determined by the main timing mechanism. This auxiliary mechanism will now be described, with particular reference to Figs. 4, 5, and 6.

A bracket 105 is secured to plate 9 and carries a pivoted lever 106. The end of this lever is slotted at 113, as seen in Fig. 6, and a part of arm 63, Fig. 4, extends through this slot. There is also mounted on plate 9 a bracket 110, to which is secured a flat spring 107. This spring 107 carries a wedge shaped member 108 and is tensioned so that the wedge 108 is pressed against the rounded end of lever 106. When the bi-metal strip 52 is heated and bends as a result thereof the arm 63 rotates the lever 106 on its pivot. About half way in the movement of arm 63 the wedge 108 begins to ride up on the cam surface 114 on the rounded end of lever 106 and the spring 107 begins to offer resistance to the bending of bi-metal strip 52. This resistance ceases as soon as the wedge 108 rides up on top of the cam surface, which occurs shortly before the springs 56 and 55 are separated. On the return movement of arm 63, due to cooling of bi-metal strip 52, the wedge 108 clears the cam surface 114 before the member 60 engages arm 86 and begins to exert pressure against it.

The foregoing arrangement causes the bi-metal strip to perform a certain amount of work while it is bending responsive to being heated and makes the heating time, and consequently the cooling time, longer than it would otherwise be. The amount of work done can be regulated by adjusting the tension of spring 107 to the proper value. This value is a maximum and is progressively decreased by the bi-metal strip 109 as the toasting compartment becomes heated. The strip 109 is supported on the bracket 22, which is attached directly to the end 13 of the toasting compartment and receives heat therefrom. There is an opening 112 cut in plate 9 to allow bracket 22 to pass through it. As the strip 109 becomes heated it bends to the left, Fig. 4, and begins to bear against the button 115 on spring 107. The effect of strip 109 therefore is to gradually relieve the tension in spring 107. Suitable adjusting means may be provided for spring 107 and strip 109. As shown herein the brackets which support these elements are movable to different positions.

The bracket 112 and bi-metal strip 109 may be covered with some kind of heat insulating material such as asbestos in order to prevent heat from being dissipated in the timing compartment. This covering is omitted in the drawings for the sake of clarity.

The operation of the toaster will now be explained, with special reference to the functioning of the timing mechanism. The toaster being in normal condition as shown in Fig. 2, the operator opens the slice carrier D by means of handle 17 and inserts two slices of bread. The slice carrier is then closed and the cord is plugged into a convenient receptacle. This starts the toasting operation.

Current flow in heating coil 54 now heats up the bi-metal strip 52, which soon loses its tension against arm 86 and begins to bend. As seen in Fig. 3, the lower end carrying member 60 moves to the right. The lever 106, Figs. 4 and 6, is of course operated as previously explained. After moving some distance, the arm 62 engages arm 86 and moves the lever 85 on its pivot, with the result that spring 90 is released to the position in which it appears in Figs. 10 and 11. At about the same time arm 61 engages member 97 and moves spring 56 away from spring 55, breaking the circuit of heating coil 54. The bi-metal strip 52 continues to bend for a brief interval after the current is shut off, and arm 61 moves far enough after contacts 56 and 55 are separated to insure a reliable locking of member 97 on dog 99, which is now in the position in which it is shown in Fig. 10.

The bi-metal strip 52 now begins to cool off, and the end thereof carrying member 60 returns toward its original position. The operation of lever 106 on the return movement does not appreciably oppose this movement. On the other hand, there is no net gain, because although the movement is somewhat accelerated while the wedge 108 is riding down the cam surface 114, there is a compensating pause or slowing up of the movement after the acceleration ceases and before the member 60 engages arm 86. In other words, the work performed by strip 52 during its movement responsive to heating is not effectively returned to it.

When member 60 engages arm 86 on the return movement the movement stops and the bi-metal strip 52 begins to store up tension. When this tension becomes strong enough to overcome the tension of spring 45, the lever 85 is rotated, arm 87 moves the end of locking arm 40 down through the medium of spring 90, and as this moves the locking link 48 off dead center, the locking arm 40 is released. As a result of the release of the locking arm 40, the lever 36 in the base of the toaster turns rapidly on its pivot under the power of spring 39 and the throw out cam 37 ejects the slice carrier.

The movement of the lever 36 in the ejecting operation is of course accompanied by a longitudinal movement of the locking arm 40, with results previously explained. The link 48 assumes the position in which it is shown in Fig. 12. The arm 94 engages the tail of dog 99 and trips it, but member 97 is caught and held by arm 96 before contacts 55 and 56 can close. It should be pointed out also that shortly after the longitudinal movement of locking arm 40 begins the spring 90 slides off the operating face of arm 87, which permits the spring 45 to raise the arm 40 again and during the major portion of its longitudinal movement it rides against the upper edge of slot 43. It will be observed that the positive disengagement of spring 90 is insured by member 91, which permits the spring 90 to bend in only one direction.

The first toasting operation has now been completed. The operator is of course amply notified by the ejection of the slice carrier, and will remove the two slices of toast, replace them with two more slices of bread, and again close the slice carrier. When the slice carrier is closed the cam 37 is forced down and the lever 36 is rotated on its pivot, storing tension in spring 39. Locking arm 40 also moves to locking position, where locking link 48 drops in place and holds it. It will be observed that although the arm 87 is still in the position in which it released the locking arm 40, the latter nevertheless becomes locked on reclosure of the slice carrier, because the spring 90 has slipped off the operating face of arm 87 and lies in the notch which is cut in this arm. When the arm 40 moves to locking position the spring 90 bends away from member 91 and assumes the position in which it is shown in Figs. 3 and 5. The movement of the locking arm 40 to locking position also causes arm 96 to release member 97 and spring 56 as previously explained, allowing the latter to engage spring 55 and again close the circuit of heating coil 54. Thus the second toasting operation and the timing thereof are started.

It will be convenient to pause here and point out certain characteristics of the bi-metal element 52. Since the cooling time of this element is made use of in the timing operation and since timing operations have to be performed in quick succession, it is desirable and in fact necessary to avoid raising the temperature in the timing compartment to any great extent. To this end the bi-metal element is so constructed that it will heat up very quickly, comparatively speaking. For instance, it requires about one minute and forty seconds for an average toasting operation. The time varies somewhat depending on the toasting compartment used, but the time given above is a fair example. Of this total period, about ten seconds, more or less, depending on considerations to be explained, are consumed in the heating of the bi-metal strip and the remainder of the period is the cooling time. Thus heat is being introduced into the timing compartment for only a very small part of the total time and the parts have ample opportunity to cool off. The cooling is facilitated by the cooling fins 77 and by the circulation of air up through the timing compartment. It is found that the desired quick heating can be secured by using a wide and comparatively thin bi-metal strip, thus presenting as large a surface as possible to the heating coil. The necessary stiffness is secured by using a wide strip rather than a thick and narrow one, and the wide strip is bisected to avoid trouble from transverse curvature during heating.

Continuing now with the second toasting operation, the heating period of the bi-metal strip will be several seconds shorter than it was in the first toasting operation, because then it was heated from room temperature whereas in the second toasting operation, assuming it takes place promptly, it is being heated from a temperature much higher. That is, the lower limit of the operating range, the temperature at which the bi-metal strip trips the locking arm 40, is considerably above room temperature. This fact results in the second toasting operation being terminated slightly sooner than the first one was, that is, the second interval measured by the timing device is somewhat shorter than the first interval. This is as it should be, for the toasting compartment is hotter and less time is required.

On the third toasting operation the bi-metal strip begins to heat from approximately the same temperature that it had at the beginning of the second operation and consequently it measures, or attempts to measure, the same time interval. As a matter of fact by this time the support for the bi-metal strip has been warmed up a little, also member 60, which interferes with the cooling slightly and tends to somewhat lengthen the time interval. This result is substantially avoided by the provision of the cooling fins 77, which prevent the support from getting more than perceptibly warm. Cooling fins could also be provided on member 60 but are not necessary. Furthermore, on the third toasting operation the bi-metal strip 109 begins to have a decided effect. This element and the mounting thereof may be designed so that the heating of the element will be delayed, and the desired shortening of the second timed interval will therefore depend mainly on the shorter heating time of element 52, as explained above. However, by the time the third toasting operation has started, the element 109 will have become heated somewhat and will have partially relieved the tension in spring 107. This of course reduces the heating time of strip 52, and since it receives less heat it takes a shorter time to cool. The third toasting operation is thus timed to terminate somewhat sooner than the second.

The bi-metal strip 109 continues to affect the timing for several more toasting operations, but eventually reaches its maximum temperature, at which time the tension in spring 107 will be substantially or entirely counter-acted and no further change in the timing will occur. By this time the toasting compartment will also have reached its maximum temperature and no change in the timing is necessary.

The timing interval can be adjusted at will by turning the knob 20. This operation alters the basic time interval which is measured by the bi-metal strip 52. The notations "Light" and "Dark" accompanied by arrows may be stamped on the casing of the timing compartment so that the operator can tell which way to turn the knob to produce the desired result. When the knob is turned in the direction "Light" the support for the bi-metal strip 52 is rotated in a clock-wise direction on pivot rod 76, the tension of the bi-metal strip against arm 86 (when cool) is increased, and the time interval measured is decreased. When the knob is turned in the direction "Dark", the opposite effect is produced. These results are explained by the fact that the increased tension placed on the bi-metal strip has the effect of translating or moving the operating temperature range higher up the scale and by the further fact that when operating within a high temperature range the bi-metal strip is able to dissipate heat much faster than when operating within a low temperature range and therefore cools off more rapidly.

While certain specific forms of construction have been shown herein for convenience in clearly explaining the principles of the invention, it will be understood that modifications may be made and that the invention has other uses than the use as a timer for an automatic toaster. We do not wish to be limited therefore to the specific use and construction shown and described, but desire to include and secure the protection of Letters Patent for all forms and modifications of the invention that come within the scope of the appended claims.

What we claim is:

1. In a timer, a bi-metallic strip, secured at one end and having the other end free to move, means for moving and returning said free end through a predetermined distance by heating and cooling the strip, and adjusting means for shifting up and down both limits of the temperature range to which the movement and return of said strip is responsive while the said distance is maintained constant.

2. In a timer, a heat responsive element, means for heating said element and for cooling the same to measure a time interval, means for causing said element to perform work during the heating period, and means for varying the amount of work performed to vary the amount of heat delivered during the heating period.

3. In a timer, a bi-metallic strip, means for measuring a time interval by heating and cooling said strip, cooling fins secured to said strip, a casing surrounding said strip, and suitable openings in said casing for giving rise to a draft of air past said fins to cool the same.

4. In combination, a member movable to either of two positions, means for locking said member in one position, said locking means including a pivoted member which is on dead center when the locking means is in locking position, and means including a heat responsive element for moving said member off dead center and thereby release the said locking means.

5. In a bread toaster, a toasting compartment, a slice carrier hinged relative to said compartment and freely movable on its hinge from a position outside said compartment to a position inside said compartment, a spring operated ejector associated with said compartment and set by movement of said carrier into the same, means for locking said ejector in set position, said carrier being movable out of the compartment while the ejector is locked but normally remaining in said compartment by the action of gravity, a timer, and means controlled by said timer to release said ejector and thereby give an impulse to said carrier to expel the same from said compartment.

6. In combination, heat treating apparatus comprising a source of heat and a carrier for an article to be treated, a heat responsive element, an electrical heater for said element, a circuit for said heater rendered effective concurrently with the movement of said carrier to operative position adjacent said heat source, a switch member operated responsive to heating of said element to render said circuit ineffective, means for locking said switch member while the element cools, means for moving said carrier away from said heat source responsive to cooling of said element, and means operated concurrently with movement of said carrier for releasing said locking means and for preventing movement of said switch member responsive to such release.

7. In a heat treating apparatus, the combination with a heat source and a carrier for an article to be treated, of a timer comprising a bi-metallic strip for determining periods of operative relation between said carrier and heat source by heating and cooling, an electrical heater for said strip, a circuit for said heater, a switch member operated by movement of said strip responsive to heating thereof for stopping current flow in said circuit, the operation of said member continuing responsive to the further movement of said strip after the flow of current in said circuit has ceased and retaining means for said switch member effective only after the operation thereof has continued for a predetermined extent after the current flow in said circuit has ceased.

8. In a timer, a bi-metallic strip, two thin strips of insulation assembled one on each side of said bi-metallic strip, a heating coil wound around the complete assembly, whereby said bi-metallic strip may be heated by conduction through said strips of insulation, said strips of insulation, however, tending to prevent cooling of said bi-metallic strip by radiation, and one or more cooling fins conductively secured to said bi-metallic strip at one end thereof, said fin or fins being of good conducting material and having a large surface exposed to the air, whereby that portion of the bi-metallic strip which is covered by said strips of insulation is cooled by conduction along the strip toward the end where said fin or fins are attached.

9. In a toaster, a base, a toasting compartment and a timing compartment supported side by side on said base, a timer comprising a bi-metallic strip mounted vertically in said timing compartment, means for timing an operation in said toasting compartment by heating and cooling said strip, openings at the bottom and top of said timing compartment to permit entrance and egress of air, whereby a draft is established by heat dissipated in the operation of said timer, and cooling fins attached to said strip and extending across the timing compartment in the air draft to assist in cooling said strip.

10. In a heat treatment apparatus, a source of heat, a carrier adapted to be moved into operative relation with said heat source, ejecting means set by movement of said carrier, means for locking said ejecting means, a bi-metallic strip and means for heating it, and releasing means for said locking means operated by power stored in said strip by the unequal contraction of the different layers thereof responsive to cooling.

11. In a heat treatment apparatus, a source of heat, a carrier adapted to be moved into operative relation with said heat source, ejecting means set by movement of said carrier, locking means, a bi-metallic strip, means for heating said strip and allowing it to cool, whereby movement is imparted to one end thereof, and releasing means including a part opposing and preventing movement of the end of said strip on cooling until enough power has been stored in said strip to operate said releasing means to release said locking means.

12. In combination, a machine, a movable carrier, ejecting means set responsive to movement of said carrier into operative relation with said machine, locking means, a bi-metallic strip, means for flexing and unflexing the strip by heating and cooling the same, and releasing means for said locking means operated by power developed in said strip on cooling and arranged to oppose unflexing of the strip until sufficient power is developed therein to operate it.

13. The combination, with an apparatus adapted to perform a given operation, of a timing mechanism for automatically stopping such operation after a predetermined interval, said mechanism comprising a resilient bi-metallic strip, means supporting said strip at one end, means for producing forward and return movement of the free end by heating and cooling the strip, means for timing the heating with relation to the starting of said operation, means for stopping the return movement of the free end to store tension in the strip, and means for utilizing the power of the tensioned strip to stop said operation.

14. The combination, with a machine, of a resilient bi-metallic strip, a heating device, means for storing energy in said strip by producing a deformation thereof under the temporary action of heat from said device, means for converting the stored energy into mechanical power by opposing the tendency of the strip to resume its normal state on cooling, and means for applying such power to control said machine.

15. In a timer, a resilient bi-metallic strip, a support to which said strip is attached at one end, means for moving the free end of the strip back and forth by heating and cooling the strip, means for stopping the movement in one direction by stopping the heating, a control device adapted to be operated by the strip for stopping the movement in the other direction, whereby further cooling of the strip stores up tension in the strip and operates said device, and means for adjusting said support to vary the position said free end tends to assume when cold and thereby vary the temperature to which the strip has to be cooled before operative tension is produced.

16. The combination, with a machine, of a timing mechanism, said mechanism comprising a bi-metallic strip, a support for one end of said strip, means for moving the free end of said strip and returning it by heating and cooling the strip, means for utilizing the traverse of said free end to time the operation of said machine, and means for adjusting said support to shift the temperature range to which such traverse corresponds.

17. In a timer, a resilient bi-metallic strip, a support to which said strip is secured at one end, means for moving the free end of the strip back and forth by heating and cooling the strip, means for limiting the movement of said free end in the direction it moves on cooling, and means for variably adjusting said support so that the said free end tends to assume a variable position beyond the point to which its movement on cooling is limited, thereby maintaining said strip under a desired variable tension when cold.

18. The combination, with a machine, of a timing mechanism, said mechanism comprising a bi-metallic strip normally under tension, means for heating and cooling said strip, means for utilizing movement of said strip responsive to said heating and cooling to time the operation of said machine, and means for varying the normal tension of said strip to vary the time interval.

19. In an automatic toaster, a slice carrier movable to toasting position, locking means, release means normally ineffective to prevent the functioning of said locking means, a bi-metallic strip supported at one end, means for moving the free end of said strip in one direction by heating the strip and thereby prepare the releasing means to transfer a mechanical force to the locking means from the free end of the strip when the strip cools, and means for interrupting the heating action to permit the strip to cool to thereby move said free end in the opposite direction and apply force to the release means, whereby the latter is operated to release the locking means.

20. In a heat treatment apparatus, a source of heat, a movable carrier, means tending to move said carrier away from said heat source, latching means for rendering said last means ineffective when said carrier is moved toward said heat source, a bi-metallic strip anchored at one end, means for heating and cooling said strip to cause the free end to move to and fro by the unequal expansion and contraction of the different layers of the strip, and releasing means moved into operative position responsive to movement of the said free end in one direction, said releasing means being operated to release the said latching means responsive to movement of the said free end in the other direction.

21. In an automatic toaster, a toasting compartment, a slice carrier movable in and out of said compartment, ejector means set by said carrier when it is moved into said compartment, a timer comprising a bi-metallic strip, means for releasing said ejector means by heating and cooling said strip including heating means independent of the heating means in said toasting compartment, a second bi-metallic strip arranged to receive heat from said toasting compartment, and means including said second strip for changing the time interval measured by the said first strip.

22. The method of variably timing an operation by means of a bi-metallic strip which consists in moving one end of the strip forward and back over a fixed operative range by heating and cooling the strip, starting the heating at the beginning of the operation to be timed, causing the forward movement to stop the heating, causing the return movement to stop the operation, shifting up and down the temperature range to which the said movements are responsive, and utilizing the increasingly rapid dissipation of heat at successively higher temperature ranges to hasten the cooling of said strip and thereby progressively shorten the timing.

23. The method of variably timing an operation by means of a bi-metallic strip which consists in moving one end of the strip forward and back over a fixed operative range by heating and cooling the strip, utilizing the total of time occupied in the forward and backward movements to time the operation, shifting the temperature range to which the said movements are responsive up and down, utilizing the more rapid dissipation of heat at high positions of the temperature range to hasten the cooling and shorten the timing, and adjusting the ratio of heating time to cooling time so that the somewhat longer heating time required when operating with a high position of the temperature range will cancel only a small part of the decrease in the total time interval due to the more rapid cooling.

24. In a timer which utilizes the cooling interval of a heat responsive element to time an operation, the method of varying the time interval for successive operations which consists in heating the element to successively higher temperatures, utilizing successively higher temperatures to which the element is cooled to stop the operations, and utilizing the more rapid dissipation of heat at the successively higher temperature ranges thus employed to progressively shorten the time interval.

25. The method of timing an operation by means of a resilient bi-metallic strip, which consists in flexing the strip by heating it, starting the heating concurrently with the starting of the operation to be timed, stopping the heating responsive to a predetermined amount of flexing, unflexing the strip by cooling it, stopping the unflexing of the strip, utilizing the resiliency of the strip to store up power, and causing the stored up power after it has reached a predetermined value to stop the operation.

26. In an automatic toaster having a movable slice carrier, an ejecting device, and means for locking the ejecting device with the carrier in toasting position, the method of unlocking said device by means of a resilient bi-metallic strip which consists in supporting the strip at one end, heating and cooling the strip to move the free end forward and return, causing the forward movement to effect an operative mechanical relation between the free end and said locking means, and thereby causing the said free end on its return movement to apply force to said locking means and release the same.

27. In an automatic toaster, a toasting compartment for receiving slices of bread to be toasted, a timer including a bi-metallic strip, means outside said compartment for heating said strip at the beginning of a toasting operation, means responsive to flexing of said strip on heating for terminating the heating thereof, means responsive to unflexing of said strip on cooling for terminating the toasting operation, means for causing said strip to perform work on flexing thereof while heating, and means including a second bi-metallic strip receiving heat from said toasting compartment for varying the amount of work performed to thereby vary the duration of the heating interval of said first strip.

28. In an automatic toaster, a toasting compartment, a slice carrier movable in and out of said compartment, a bi-metallic strip, an electrical heater for said strip, a circuit for said strip rendered effective when said carrier is moved into said compartment, means responsive to flexing of said strip in one direction on heating for rendering said circuit ineffective, and means responsive to flexing of said strip in the opposite direction on cooling for expelling said carrier from said compartment.

29. In an automatic toaster, a toasting compartment, a hinged slice carrier movable on its hinge in and out of said compartment, an ejector device for said carrier including a pivoted member and a spring opposing rotation thereof, means for automatically setting said device by rotating said member on its pivot when said carrier is moved into said compartment, thereby tensioning said spring, means for locking said device in set position, said carrier being movable out of said compartment while the ejector device is locked but normally remaining therein, and a timer started when said carrier is moved into said compartment and effective after a predetermined interval to release said ejector device.

30. In an automatic toaster, a toasting compartment, a slice carrier movable in and out of said compartment, an ejector device set when said carrier is moved into said compartment, a timer comprising a bi-metallic strip, means for releasing said device by heating and cooling said strip, means responsive to movement of the strip on heating for terminating the heating period, and means including a spring opposing movement of the strip to prolong the heating period.

31. In an automatic toaster, a toasting compartment, a slice carrier movable in and out of said compartment, an ejector device for said carrier set when said carrier is moved into said compartment, means for locking said device, a timer comprising a bi-metallic strip, means effective upon setting of said device for storing energy in said strip by deforming the same under the action of heat, means responsive to such deformation for stopping the heating action, and means for applying the energy released upon cooling of said strip to unlock said ejector device.

HAROLD J. McCREARY.
RODNEY G. RICHARDSON.

DISCLAIMER 2,167,121.—*Harold J. McCreary*, Lombard, and *Rodney G. Richardson*, Chicago, Ill. TIMING AND TIMING DEVICE. Patent dated July 25, 1939. Disclaimer filed September 29, 1941, by the assignee, *McGraw Electric Company*.

Hereby enters this disclaimer to claims 1, 16, 17, 18, 19, 22, 23, 24, and 26 of said patent.

[*Official Gazette October 21, 1941.*]

device for said carrier including a pivoted member and a spring opposing rotation thereof, means for automatically setting said device by rotating said member on its pivot when said carrier is moved into said compartment, thereby tensioning said spring, means for locking said device in set position, said carrier being movable out of said compartment while the ejector device is locked but normally remaining therein, and a timer started when said carrier is moved into said compartment and effective after a predetermined interval to release said ejector device.

30. In an automatic toaster, a toasting compartment, a slice carrier movable in and out of said compartment, an ejector device set when said carrier is moved into said compartment, a timer comprising a bi-metallic strip, means for releasing said device by heating and cooling said strip, means responsive to movement of the strip on heating for terminating the heating period, and means including a spring opposing movement of the strip to prolong the heating period.

31. In an automatic toaster, a toasting compartment, a slice carrier movable in and out of said compartment, an ejector device for said carrier set when said carrier is moved into said compartment, means for locking said device, a timer comprising a bi-metallic strip, means effective upon setting of said device for storing energy in said strip by deforming the same under the action of heat, means responsive to such deformation for stopping the heating action, and means for applying the energy released upon cooling of said strip to unlock said ejector device.

HAROLD J. McCREARY.
RODNEY G. RICHARDSON.

DISCLAIMER 2,167,121.—*Harold J. McCreary*, Lombard, and *Rodney G. Richardson*, Chicago, Ill. TIMING AND TIMING DEVICE. Patent dated July 25, 1939. Disclaimer filed September 29, 1941, by the assignee, *McGraw Electric Company*.

Hereby enters this disclaimer to claims 1, 16, 17, 18, 19, 22, 23, 24, and 26 of said patent.

[*Official Gazette October 21, 1941.*]